United States Patent [19]

Thierry et al.

[11] Patent Number: 4,897,821
[45] Date of Patent: Jan. 30, 1990

[54] METHOD AND DEVICE FOR INITIALIZING DATA, AND PARTICULARLY SEISMIC DATA, ACQUISITION APPARATUS

[75] Inventors: Gérard Thierry, Paris; Joseph Rialan, Meudon, both of France

[73] Assignee: Institut Francais du Petrole, Rueil-Malmaison, France

[21] Appl. No.: 302,336

[22] Filed: Jan. 27, 1989

Related U.S. Application Data

[63] Continuation of Ser. No. 86,558, Aug. 18, 1987, abandoned.

[30] Foreign Application Priority Data

Aug. 18, 1986 [FR] France .................................. 86 11876

[51] Int. Cl.[4] ........................................... H04B 17/00
[52] U.S. Cl. ......................................... 367/13; 367/76; 455/603
[58] Field of Search ..................... 367/13, 76; 455/603; 346/33 C

[56] References Cited

U.S. PATENT DOCUMENTS

| | | | |
|---|---|---|---|
| 4,493,063 | 1/1985 | Tims et al. | 367/77 |
| 4,517,562 | 5/1985 | Martinez | 455/45 |
| 4,639,901 | 1/1987 | Warmack et al. | 367/77 |

OTHER PUBLICATIONS

"Infrared Transmitter and Receiver," Margolin, S. M., Radio Electronics, Aug. 1984.

*Primary Examiner*—Thomas H. Yarcza
*Assistant Examiner*—Ian J. Lobo
*Attorney, Agent, or Firm*—Antonelli, Terry & Wands

[57] ABSTRACT

A method and device are provided for initializing acquisition apparatus including the use of coded infrared rays for transmitting data and a control case, the initialization being provided by modulating a light beam in amplitude by means of a carrier signal, this latter being modulated both in frequency and in phase and the modulation depending on the initialization signals. A programmable processing unit delivers the digital data to an infrared ray transmitter, the light signals received in return from the acquisition cases provided with similar transmission means being received by an infrared receiver, decoded and reshaped before being applied to the processing unit.

12 Claims, 2 Drawing Sheets

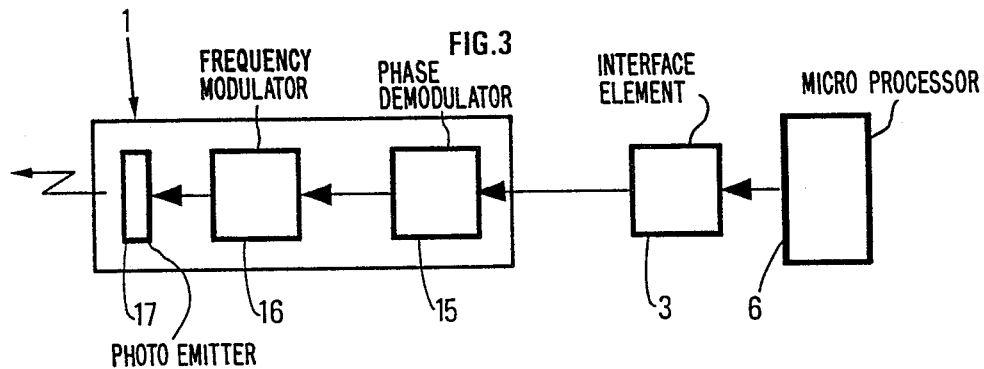
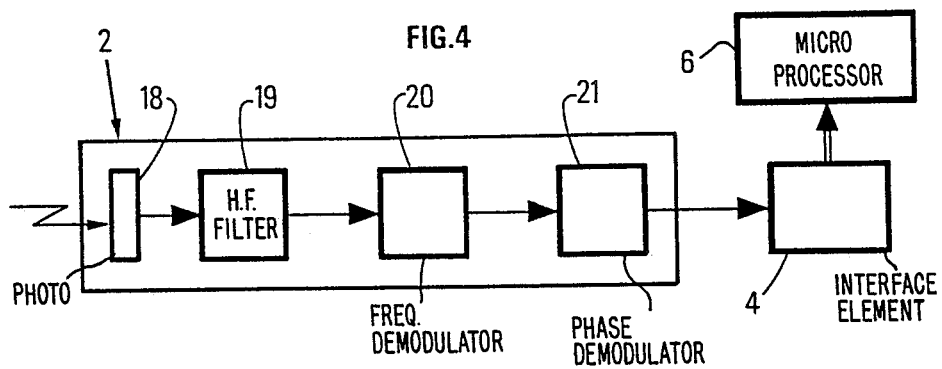

METHOD AND DEVICE FOR INITIALIZING DATA, AND PARTICULARLY SEISMIC DATA, ACQUISITION APPARATUS

This is a continuation divisional application of Ser. No. 086,558, filed Aug. 18, 1987 now abandoned.

BACKGROUND OF THE INVENTION

1. Field of the Invention

The invention relates to a method for initializing data, particularly seismic data, acquisition apparatus and a device for implementing same.

The method and device of the invention apply in particular to the initialization of seismic data acquisition apparatus such as they are used in present day seismic prospection systems. A very large number of geophones or hydrophones are disposed along the seismic profile to be studied.

These sensors, which may be distributed over lengths of several kilometers, are associated with acquisition apparatus. Seismic waves having been transmitted into the ground, the waves reflected by the different subterranean discontinuities are received by means of the sensors. The signals picked up are collected, digitized and stored in the acquisition apparatus. Once the reception and recording cycle is finished, a seismic laboratory centralizes all the data by sequentially ordering all the acquisition apparatus to transmit to it those which have been respectively collected. The transmission may take place over a transmission cable connecting all the acquisition apparatus to the seismic laboratory or else by short wave link.

2. Description of the Prior Art

A mixed short wave link or cable transmission system is described in the publsihed French patent applications n°2 511 772 and 2 538 561 and in the French patent application EN 86/07930. It is adapted to acquisition apparatus arranged for receiving orders from a central control and recording system and for transmitting data thereto by a radio, unless a transmission cable is connected to them. In this case, the radio transmission-reception means are automatically switched off, the orders and the data being exchanged through the transmission cable. The acquisition apparatus and their particular transmission means are disposed in sealed cases possibly associated with buoys, which are deposited on the ground, at a certain distance from each other and connected to the seismic receivers. They are well adapted to collecting data during seismic prospection operations carried out in difficult zones, whether they are very humid zones: lakes, marshes, etc, zones whose relief and/or vegetation make short wave link transmissions problematical, or zones where the regulations concerning radio-transmission are very restrictive. One or more relay stations disposed between the central laboratory and directly inacessible cases or buoys may be used for facilitating centralization of the seismic data.

The different acquisition cases fulfill very complex functions, whether from the point of view of seismic data acquisition or transmission thereof to the central laboratory. The data coming from the sensors are first of all amplified and filtered. Then they are sampled and digitized before being stored. The result obtained by the acquisition chain depends on the frequency of sampling the data, and on the characteristics of the low pass and high pass electronic filters which it comprises. With the recording cycle terminated, orders and data relative to a case are very often transferred over a short wave link. The frequency of the radio carrier used depends on the local telecommunications regulations and also on the position of the case in the seismic reception system disposed on the ground. Depending on whether the case may be reached directly from the central short wave link connection station or else can only be reached through a relay station, the communication frequency may be different.

The great variety of operating conditions to which a seismic reception system must correspond make necessary the use of readily adaptable acquisition cases. The introduction of the initial conditions must be able to be carried out after positioning of the cases, in the very position where they are located, under optimum conditions of reliability and rapidity.

Initialization of the acquisition cases is easy on dry land. One or more operators provided with control boxes go to the site, to the very place at which acquistion cases are installed. Each of the cases is provided with a readily accessible socket which the operator frees for connecting thereto a cable connected to his initialization box.

It is quite different when the seismic reception and transmission system is installed in difficult regions. This is more particularly the case in marshy zones where very often the buoys supporting the cases can only be reached by boat. The effective connection of a control box by cable to each acquisition case is made more complicated because of the sealing devices protecting the electronic circuits and their access zones from water.

The method of the invention allows the rapid initialization of acquisition cases each adapted for collecting signals delivered by sensors, processing them and recording them and, on a control from a central laboratory, transferring thereto the data relative to said signals, following a given transmission channel.

SUMMARY OF THE INVENTION

The invention includes the use of a light ray transmission system having a first mobile control unit and a plurality of secondary unit associated respectively with the different acquisition apparatus, the displacement of the first mobile control unit to the vicinity of each of the acquisition apparatus successively and transmission to the acquisition apparatus of operating parameters.

The device for implementing the method includes a first control unit formed of a transmitting element adapted for transmitting infra red rays modulated in accordance with the initialization signals to be transmitted, a reception element adapted for demodulating the infrared light signals, a programmable processing member and interface circuits between the processing member and the transmission and reception elements. It also comprises a plurality of secondary units associated respectively with the different acquisition cases and each formed of a transmission element adapted for transmitting modulated infrared signals, an element for receiving the identification signals coming from the first control assembly and interface circuits for connecting the transmission element and the reception element to the programmable processing member of the corresponding acquisition case.

Preferably, the transmission elements include means for generating a carrier signal frequency modulated by a second signal whose phase is modified as a function of the data to be transmitted and means for modulating an infrared light beam in amplitude with the carrier signal.

The method of the invention and the device for implementing same allow acquisition cases to be rapidly initialized, whatever the conditions of use, without having to establish a physical connection between them and the first control unit. The initialization operations are simple and reliable.

They may be performed by an operator passing close by (in a bot if the zone of use is immersed) and holding in his hand an initialization box containing the first control unit.

The type of transmission chosen provides good immunity to variations of the ambient light, to parasitic noises and a very good selectivity, which allows each acquisition case to be initialized in particular without the risk of multiple initializations.

BRIEF DESCRIPTION OF THE DRAWINGS

Other features and advantages of the method will be clear from reading the following description of a preferred embodiment, given by way of non limitative example and illustrated by the accompanying drawings in which:

FIG. 3 shows the block diagram of a modulated infrared ray transmission element, and FIG. 4 shows the block diagram of a modulated infrared ray reception element.

DESCRIPTION OF THE PREFERRED EMBODIMENT

Figure 1:
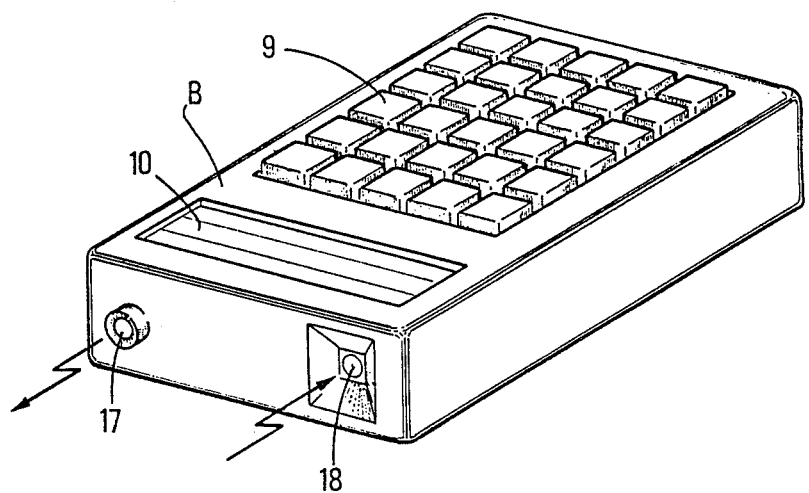
FIG. 1 shows an initialization case containing the first infrared transmission-reception unit.
Figure 2:
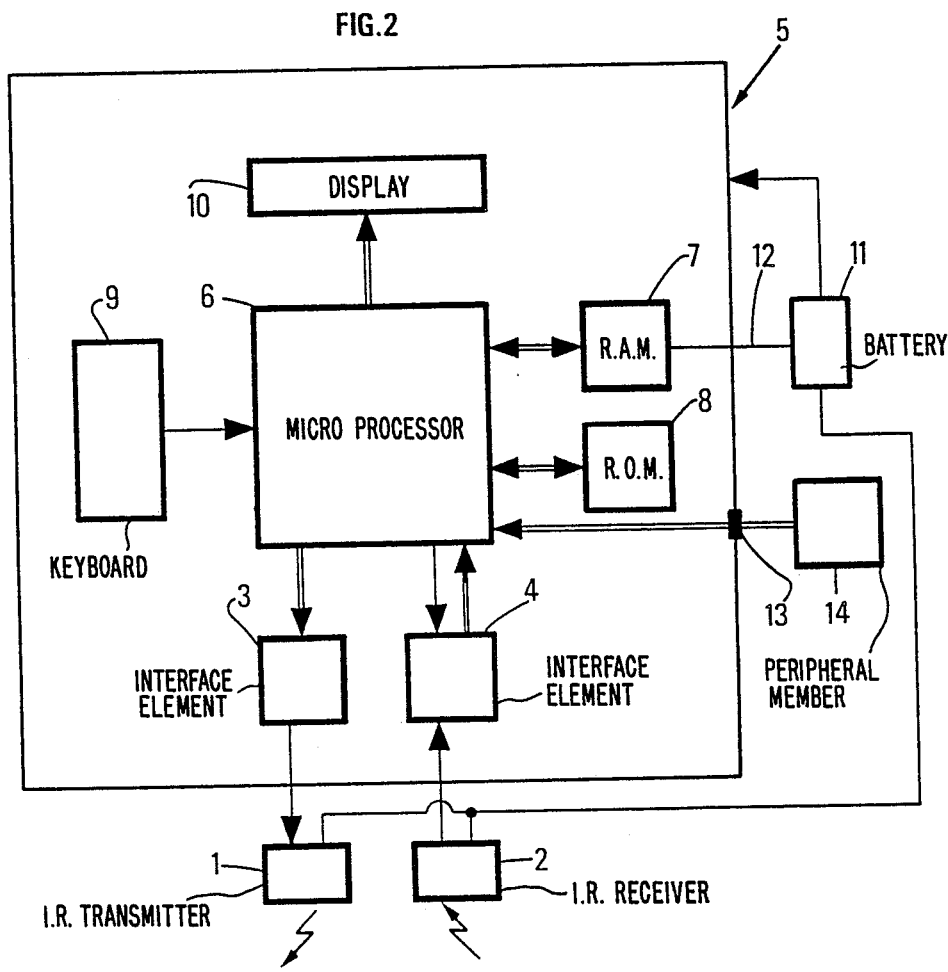
FIG. 2 shows the block diagram of the first infrared transmission-reception unit.

Inside the (or each) initialization case B (FIG. 1) is disposed a first unit (FIG. 2) including an infrared ray transmitter 1 and an infrared ray receiver 2 connected, through two interface elements respectively 3, 4 to a microcomputer 5. This latter includes a microprocessor 6 communicating with an RAM 7 and an ROM 8. These two memories contain programs and data for communicating operating parameters to each acquisition case. A keyboard 9 is used for triggering the different data transmission operations or for carring out tests. By means of a visulization element or display unit 10, the orders or data transmitted or received during each initialization process can be checked. A battery 11 feeds the microcomputer 5 and elements 1 and 2 for the transmission and reception of infrared rays. The safeguard of the data contained in the RAM is provided by a permanent connection 12 between it and battery 11.

The microcomputer 5 includes a socket 13 to which a cable may be connected for connection with any peripheral member 14.

The transmission of the infrared signals is provided by modulating an infrared beam in amplitude by means of a modulation signal. This signal is formed of a carrier at frequency f1 (for example 100 KHz) frequency modulated by a sub-carrier at a much lower frequency f2 (1200 Hz for example), itself phase modulated by the signals to be transmitted. This type of modulation has numerous advantages.

Modulation by means of a carrier signal at a well defined frequency allows a good immunity to be obtained to the variations of the ambient light which may be observed under normal conditions of use. Frequency modulation by means of a subcarrier itself phase modulated makes the signals transmitted very insensitive to parasitic signals. Since no DC signal appears on detection of the signals transmitted in this mode, the electronic reception circuits are simplified and electronic modules may be used with very lowelectric consumption and low supply voltage. This is an important advantage because the acquisition cses are fed from a battery of accumulators and it is desirable to extend their operating independence as long as possible.

The infrared ray transmission unit 1 (FIG. 3) includes a series input/output circuit adapted for putting into the form of a bit sequence the digital words translating the data to be transmitted, supplied by the microprocessor 6.

Each digital message includes an identification preamble formed of an assembly of successive bits followed by several words. The beginning of each of them is marked by a so called starting bit. Each word is followed by a parity bit and finished by two so called stop bits.

The digital words from the input/output circuit 3 are applied to a phase modulator 15 adapted for varying the phase of a signal at frequency f2, as a function of the logic level of the successive bits. The signal from the phase modulator is then applied to a frequency modulator 16. The phase modulated signal f2, frequency modulates a signal at frequency f1. The combined signal from the frequency modulator 16 is then applied to the control input of a transmission element 17 including a photoemissive diode emitting in the infrared.

The infrared light signals received pass through a very selective high frequency filter 19 centered on frequency f1, which results in rejecting the parasitic signals related more particularly to the variations of the ambient luminosity. At the output of filter 19, the signals are applied to a frequency demodulator 20. The signal at frequency f2 from the frequency demodulator 20 is applied to a phase demodulator 21 of the programmable logic sequencer type for example which detects the modulating digital word. On detection of a part of at least of the preamble characteristic of the digital words transmitted, the phase demodulator 21 sends, through the input/output circuit 4, a logic signal indicative of the arrival of a word transmitted to the microprocessor 6. This latter in return orders the input/output circuit 4 to take this word into account and in return it orders the transmission by the transmission unit 1, of an accept word and a check word for checking the nature of the message transmitted.

Each acquisition case includes a transmission unit such as 1 (FIG. 3) and a reception unit such as 2 (FIG. 4) communicating with the microprocessor 6 managing the whole of the data acquisition tasks and transmission of this data to the central recording laboratory through input/output elements similar to elements 3, 4.

The directivity diagram of the infrared transmission and reception elements as well as their range are chosen so that the data exchanges are selective. Considering their distance along the seismic profile where they are disposed, one and only one acquisition case may be reached during an initialization operation. This simplifies the messages and decoding thereof to the extent that no address check is made by the acquisition case receiving data over the optical path.

The transmission of data between the intialization case and the acquisition cases may relate to permanent parameters and variable parameters.

The first concern for example:

the frequency with which the data received from the seismic senses must be sampled;

the transmission frequencies to be used for radio transmissin. In the above mentioned French patent application EN 86/07930 concerning a radio transmission system, acquisition cases are described including signal generators whose frequency depends on certain parameters. An infrared ray connection allows these parameters to be imposed and so the frequency of the radio exchanges to be fixed as a function of the local regulations or of the conditions of use in the region explored;

the filtering frequencies in the seismic acquisition chain of the initalization acquisition case. The seismic signals picked up from the ground are applied to high pass filters and low pass filters whose filtering characteristics may be changed by a choice of appropriate parameters, the physical identification number of each acquisition case. By means of a test, the operator may at all times identify the case without having to open it. The permanent parameters may be imposed on the acquisition cases before the seismic mission leaves for the zone to be explored, for example.

In the field, when an acquisition case is deposited, for example an operator may introduce temporary parameters related to its real position. It may be a question of its order number in the assembly of all the cases distributed along the seismic profile to be explored, its relative coordinates with respect to the others or its absolute coordinates, the water height if it is operating in an immersed zone, signals for synchronizing the clock of each acquisition case with that of the initialization case, etc. This list is of course not limitative.

What is claimed is:

1. A method for presetting seismic data acquisition apparatus distributed along a seismic profile to be explored, each adapted for collecting signals supplied by sensors, processing them and recording them and, on an order from a central laboratory, transferring thereto the data relative to said signals over a given transmission channel, which method includes:

providing a light ray transmission system that is independent of said given transmission channel having a first portable short range light ray control unit and a plurality of secondary units associated respectively with the different acquisition apparatus, for transmitting infrared rays modulated by signals to be transmitted and receiving demodulated infrared light signals;

displacing the first portable control unit to the vicinity of each of the acquisition apparatus units successively;

transmitting operating parameters from said portable unit to the secondary unit associated with each of said acquisition apparatus units one at a time on a sequential basis; and transmitting response signals from each of said secondary units back to said portable unit that confirm receipt of operating parameters transmitted by said portable unit before moving the portable unit.

2. A device for presetting seismic data acquisition apparatus distributed along a seismic profile to be explored, each adapted for collecting signals supplied by sensors, processing them and recording them and, on a command from a central laboratory, transferring thereto the signals collected over a given transmission channel under the control of a programmable processing member, said device including:

a light ray transmission system that is independent of said given transmission channel including a first portable light ray control unit having a short range;

a light ray transmission element adapted for transmitting infrared rays modulated by initialization signals to be transmitted;

a light reception element adapted for demodulating infrared light signals and a programmable processing member provided with interface circuits between the processing member and the light transmission and reception elements;

a plurality of secondary control units associated respectively with the different acquisition apparatus and each including a light transmission element adapted for transmitting modulated infrared signals, a light reception element for receiving the initialization signals coming from said first control unit; and interface circuits for connecting said light transmission element and said light reception element of the secondary control unit to the programmable processing member of said acquisition apparatus.

3. Device as claimed in claim 2, wherein said transmission elements in each said first or secondary control units include:

generating means for generating a carrier signal modulated in frequency by a second signal with variable phase depending on the data to be transmitted;

an infrared light source; and means for modulating light generated by said source with said frequency modulated carrier signal.

4. A device for presetting seismic data acquisition apparatus distributed along a seismic profile to be explored, each adapted for collecting signals supplied by sensors, processing them and recording them and, on a command from a central laboratory, transferring thereto the signals collected over a given transmission channel under the control of a programmable processing member, which device includes a first control unit having a transmission element adapted for transmitting infrared rays modulated by initialization signals to be transmitted, a reception element adapted for demodulating infrared light signals and a programmable processing member provided with interface circuits between the processing member and the transmission and reception elements, a plurality of secondary control units associated respectively with the different acquisition apparatus and each including a transmission element adapted for transmitting modulated infrared signals, an element for receiving the initialization signals, coming from the first control unit and interface circuits for connecting the transmission element and the reception element of the secondary control unit to the programmable processing member of said acquisition apparatus, wherein said transmission elements in each of said first and second control units include generating means for generating a carrier signal modulated in frequency by a second signal with variable phase depending on the data to be transmitted, an infrared light source and means for modulating light generated by said light source with said frequency modulated carrier signal, said means for generating said carrier signal modulated in frequency including connected in series, a phase modulator adapted for varying the phase of a subcarrier signal at a frequency f2 as a function of the signals to be transmitted, a frequency modulator adapted for modulating the frequency f1 of a carrier signal as a function of the subcarrier signal.

5. The device as claimed in claim 4, wherein said phase modulator in each of said first or secondary control unit is connected to the corresponding processing member in the same control unit by means of an input-/output element adapted for transforming digital words into a succession of bits.

6. The device as claimed in claim 4, wherein each reception element in each said first or secondary control unit includes, connected in series, means for receiving the infrared rays and detecting modulation signals therein, a frequency demodulator for detecting the variable phase signal, a phase demodulator for restoring the sequences of bits modulating the phase of the second subcarrier signal at a frequency f2 and detecting in these bit sequences the beginning of each of the digital words transmitted, the detection signal being transmitted to the corresponding processing member in the same control unit.

7. The device as claimed in claim 6, wherein the phase demodulator is connected to the corresponding processing member through an input/output element adapted for reconstituting the digital words transmitted, from the bit sequences received, on an order from the corresponding processing member.

8. The device as claimed in claim 4, wherein the processing member of the first control assembly includes a microcomputer associated with a control keyboard and a display element, the microcomputer being provided with inputs for the connection of peripheral apparatus.

9. A method for presetting seismic data acquisition apparatus distributed along a seismic profile to be explored, each adapted for collecting signals supplied by sensors, processing them and recording them and, on an order from a central laboratory, transferring thereto the data relative to said signals over a given transmission channel, which method includes:
providing a light ray transmission system having a first portable short range light ray control unit and a plurality of secondary units associated respectively with the different acquisition apparatus for transmitting infrared rays modulated by signals to be transmitted and receiving demodulated infra-red light signals, a direction and range of said first unit and said secondary unit being chosen so that transmission of said infra-red rays is selective and no address check is made by each data acquisition unit receiving infra-red light signals;
displacing the first portable control unit to the vicinity of each of the acquisition apparatus units successively;
transmitting operating parameters from said portable unit to the secondary unit associated with each said transmission apparatus one at a time on a sequential basis; and
transmitting response signals from each of said secondary units back to said portable unit that confirm receipt of operating parameters transmitted by said portable unit before moving the potable unit.

10. A method for transmitting presetting data to seismic data acquisition apparatus distributed along a seismic profile to be explored, each adapted for collecting signals supplied by sensors, processing them and recording them and, on an order from a central laboratory, transferring thereto the data relative to said signals over a given transmission channel, said presetting data including data previously measured on the field and relating to an actual position of each of said secondary units that is effective to distinguish the actual position of each of said units with respect to the others, which method includes:
providing a light ray transmission system that is independent of said given transmission channel having a first mobile control unit and a plurality of secondary units associated respectively with the different acquisition apparatus, for transmitting infra-red rays modulated by signals to be transmitted and receiving demodulted infrared light signals;
moving the first mobile control unit to positions adjacent the seismic profile in the vicinity of each different data acquisition apparatus one at a time in succession;
emitting modulated light rays to transmit said data available on the field relating to an actual position of each of said seimic data acquisition secondary unit including topographic coordinates and serial number;
recording said data at each of said secondary units; and
transmitting from said secondary unit to said mobile control unit information confirming receipt of the recorded information before moving the mobile control unit to a position adjacent a second secondary unit.

11. A method for transmitting presetting data to seismic data acquisition apparatus distributed along a seismic profile to be explored, each adapted for collecting signals supplied by sensors, processing them and recording them and, on an order from a central laboratory, transferring thereto the data relative to said signals over a given transmission channel, said presetting data including data previously measured on the field and relating to an actual position of each of said secondary units that is effective to distinguish the actual position of each of said units with respect to the others, which method includes:
providing a light ray transmission system having a first portable short range light ray control unit and a plurality of secondary units associated respectively with the different acquisition apparatus for transmitting infrared rays modulated by signals to be transmitted and receiving demodulated infra-red light signals, a direction and range of said first unit and said secondary unit being chosen so that transmission of said infra-red rays is selective and no address check is made by each data acquisition unit receiving infra-red light signals;
moving the first mobile control unit to positions adjacent the seismic profile in the vicinity of each different data acquisition apparatus one at a time in succession;
emitting modulated light rays to transmit said data available on the field relating to an actual position of each of said seismic data acquisition secondary unit including topographic coordinates and serial number;
recording said data at each of said secondary units; and
transmitting from said secondary unit to said mobile control unit information confirming receipt of the recorded information before moving the mobile control unit to a position adjacent a second secondary unit.

12. A device for presetting seismic data acquisition apparatus distributed along a seismic profile to be explored, each adapted for collecting signals supplied by sensors, processing them and recording them and, on a command from a central laboratory, transferring thereto the signals collected over a given transmission channel under the control of a programmable processing member, said device including:

a light ray transmission system having a first portable short range light ray control unit and a plurality of secondary units associated respectively with the different acquisition apparatus for transmitting infrared rays modulated by signals to be transmitted and receiving demodulated infrared light signals, a direction and range of said first unit and said secondary units being chosen so that transmission of said infrared rays is selective and no address check is made by each data acquisition unit receiving infrared light signals;

a light transmission element adapted for transmitting infrared rays modulated by initialization signals to be transmitted;

a light reception element adapted for demodulating infrared light signals and a programmable processing member provided with interface circuits between the processing member and the light transmission and reception elements;

a plurality of secondary control units associated respectively with the different acquisition apparatus and each including a light transmission element adapted for transmitting modulated infrared signals, a light reception element for receiving the initialization signals coming from said first control unit; and interface circuits for connecting said light transmission element and said light reception element of the secondary control unit to the programmable processing member of said acquisition apparatus.

* * * * *